US011398658B2

(12) United States Patent
Takeuchi

(10) Patent No.: US 11,398,658 B2
(45) Date of Patent: Jul. 26, 2022

(54) BATTERY PACK

(71) Applicant: KAWASAKI MOTORS, LTD., Akashi (JP)

(72) Inventor: Hiroshi Takeuchi, Kakogawa (JP)

(73) Assignee: KAWASAKI MOTORS, LTD., Akashi (JP)

( * ) Notice: Subject to any disclaimer, the term of this patent is extended or adjusted under 35 U.S.C. 154(b) by 168 days.

(21) Appl. No.: 17/000,653

(22) Filed: Aug. 24, 2020

(65) Prior Publication Data
US 2021/0111383 A1    Apr. 15, 2021

(30) Foreign Application Priority Data

Oct. 11, 2019    (JP) .............................. JP2019-187375

(51) Int. Cl.
| | | |
|---|---|---|
| *H01M 50/20* | (2021.01) | |
| *H01M 50/502* | (2021.01) | |
| *H01M 50/213* | (2021.01) | |
| *H01M 50/291* | (2021.01) | |
| *H01M 50/249* | (2021.01) | |
| *H01M 50/296* | (2021.01) | |
| *H01M 50/298* | (2021.01) | |

(52) U.S. Cl.
CPC ......... *H01M 50/20* (2021.01); *H01M 50/213* (2021.01); *H01M 50/249* (2021.01); *H01M 50/291* (2021.01); *H01M 50/296* (2021.01); *H01M 50/298* (2021.01); *H01M 50/502* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2004/0043287 A1* | 3/2004 | Bando ............... | H01M 10/6556 429/120 |
| 2019/0181400 A1* | 6/2019 | Nakasawa ........... | H01M 50/222 |

FOREIGN PATENT DOCUMENTS

| | | | | |
|---|---|---|---|---|
| JP | 3785499 B2 | * | 6/2006 | |
| JP | 2015077887 A | | 4/2015 | |
| WO | WO-2015105335 A1 | * | 7/2015 | ............ H01M 2/105 |

* cited by examiner

*Primary Examiner* — Gregg Cantelmo
(74) *Attorney, Agent, or Firm* — Alleman Hall Creasman & Tuttle LLP

(57) ABSTRACT

A battery pack includes a terminal board electrically connecting terminals of a plurality of battery cells to each other. The terminal board is thinner than a bus bar and welded to the terminals of the battery cells. The terminal board includes an elongated portion extending in a direction in which the battery cells are arranged and a plurality of fixation portions arranged at intervals on a long side of the elongated portion. The bus bar includes a plurality of fixation portions respectively placed in face-to-face contact with the fixation portions of the terminal board. Fasteners fasten the fixation portions of the terminal board and the fixation portions of the bus bar to fastener-receiving portions.

7 Claims, 5 Drawing Sheets

BATTERY PACK

CROSS-REFERENCE TO RELATED APPLICATION

This application claims priority to and the benefit of Japanese Patent Application No. 2019-187375, filed on Oct. 11, 2019, the entire disclosure of which is incorporated herein by reference.

BACKGROUND

Technical Field

An aspect of the present disclosure relates to a battery pack.

Description of the Related Art

Japanese Laid-Open Patent Application Publication No. 2015-77887 discloses a motorcycle configured as a hybrid vehicle equipped with a battery. The battery stores electric power to be supplied to a motor for travel in the electric vehicle (EV) mode.

A battery and other components of a vehicle may be subjected to vibration generated during travel of the vehicle. A possible approach to address such vibration is to weld terminals of battery cells and a terminal board together so as to stabilize the contact between the terminals and the terminal board. In this case, in order to prevent the welding from damaging the battery cells, the terminal board must be thin enough to allow the welding to be accomplished with low heat input. However, if the terminal board is thin, the terminal board may be likely to generate heat depending on, for example, the shape of the terminal board and the direction of flow of the current.

SUMMARY

A battery pack according to one aspect of the present disclosure includes: a battery cell group including a plurality of battery cells disposed parallel to each other; a holder holding the battery cell group, the holder including a first surface provided with insertion holes in which the battery cells are inserted, a second surface perpendicular to the first surface, and a plurality of fastener-receiving portions each having a fastener-receiving surface formed at the first surface; a terminal board disposed facing the first surface of the holder and electrically connecting terminals of the battery cells to each other; a bus bar electrically connected to the terminal board; and a plurality of fasteners fastening both the terminal board and the bus bar to the holder and electrically connecting the terminal board to the bus bar, wherein the terminal board is thinner than the bus bar and welded to the terminals of the battery cells, the terminal board includes an elongated portion extending in a direction in which the battery cells are arranged and a plurality of fixation portions arranged at intervals on a long side of the elongated portion, the bus bar includes a plurality of fixation portions respectively placed in face-to-face contact with the fixation portions of the terminal board, and the fasteners fasten the fixation portions of the terminal board and the fixation portions of the bus bar to the fastener-receiving portions.

In the above configuration, where the thin, elongated terminal board is welded to the terminals of the battery cells, the elongated terminal board is provided with the plurality of fixation portions on its long side and connected to the bus bar at the plurality of fixation portions. Thus, unlike the case where the terminal board is connected at its short side to the bus bar, local narrowing of the current-carrying cross-section can be prevented, and local heat generation in the terminal board can be reduced.

DETAILED DESCRIPTION OF THE EMBODIMENTS

Hereinafter, an embodiment will be described with reference to the drawings.

Figure 1:
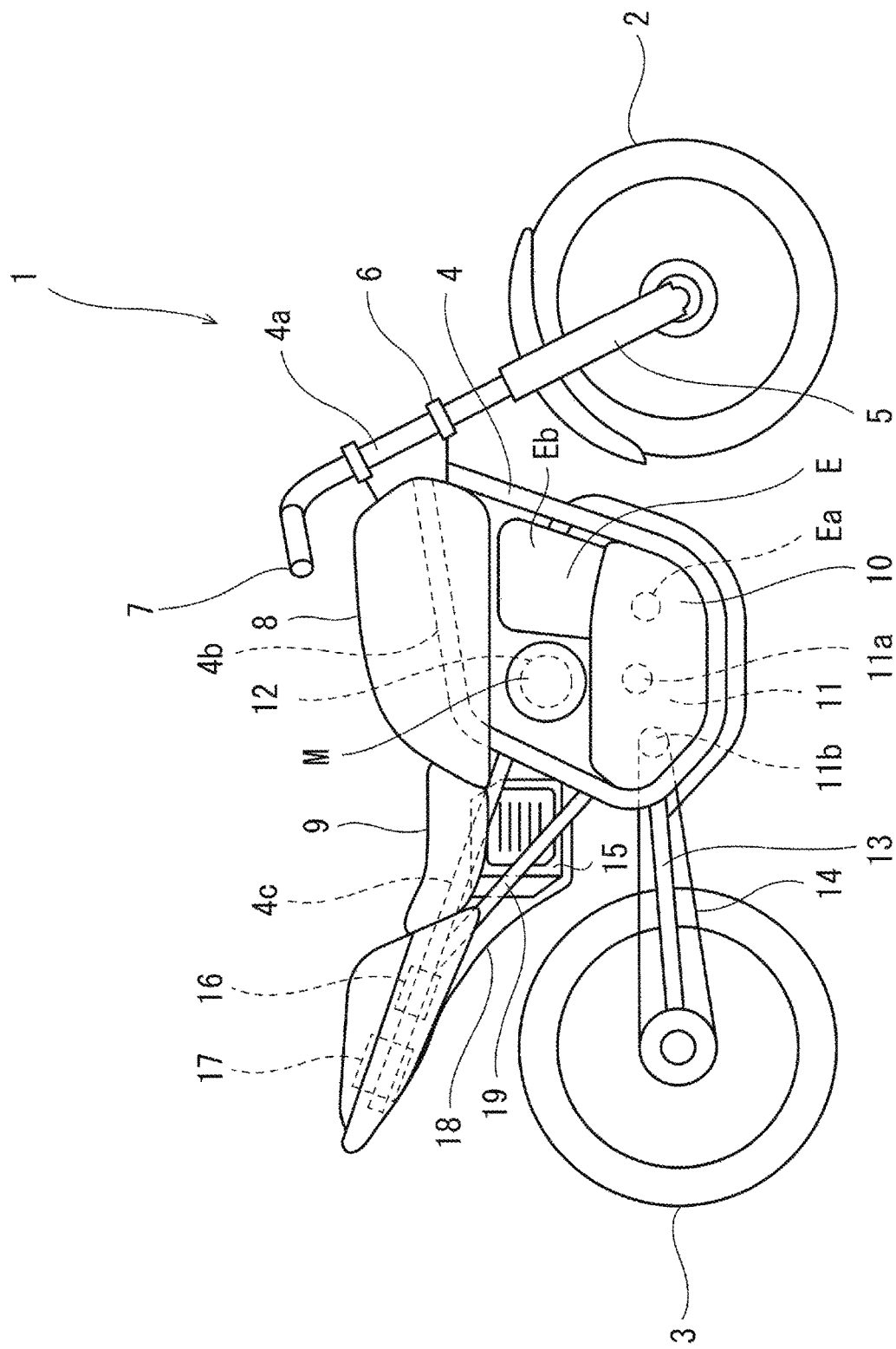
FIG. 1 is a side view of a motorcycle according to an embodiment.

FIG. 1 is a side view of a motorcycle 1 according to the embodiment. In FIG. 1, the motorcycle 1 is shown as an example of vehicles and configured as a hybrid vehicle. The motorcycle 1 includes a front wheel 2 (driven wheel), a rear wheel 3 (drive wheel), a vehicle body frame 4, a front suspension 5 connecting the front wheel 2 to a front portion of the vehicle body frame 4, and a rear suspension (not illustrated) connecting the rear wheel 3 to a rear portion of the vehicle body frame 4. The front suspension 5 is connected to a bracket 6, and a steering shaft (not illustrated) connected to a handle 7 is connected to the bracket 6. The steering shaft is supported by a head pipe 4a so as to be angularly movable. The head pipe 4a constitutes a part of the vehicle body frame 4.

The vehicle body frame 4 includes a main frame 4b extending rearward from the head pipe 4a, a seat support frame 4c extending rearward from an upper rear portion of the main frame 4b, and an auxiliary frame 4d extending from a lower portion of the main frame 4b to a middle portion of the seat support frame 4c and supporting the seat support frame 4c from below. A fuel tank 8 is disposed rearward of the handle 7, and a seat 9 on which the rider sits is disposed rearward of the fuel tank 8. The seat 9 is supported by the seat support frame 4c. On the main frame 4b is mounted an engine E serving as a power source for travel. The engine E is located between the front and rear wheels 2 and 3. An electric motor M serving as a power source for travel is disposed in the vicinity of the engine E.

The engine E includes a cylinder Eb, and a crankcase 10 extends rearward from a lower portion of the cylinder Eb. The electric motor M provided for driving the drive wheel and configured to generate drive power to be transmitted to the drive wheel is disposed rearward of the cylinder Eb of the engine E and above the crankcase 10. The electric motor M is supported by the main frame 4b via the crankcase 10. An inverter 12 is mounted integrally with the electric motor M. The inverter 12 may be disposed away from the electric motor M.

Inside the crankcase 10 is disposed a transmission 11 including an input shaft 11a and an output shaft 11b. The input shaft 11a receives power transmitted from a crankshaft Ea of the engine E through gears and a main clutch (not illustrated). The input shaft 11a of the transmission 11 receives power transmitted from the electric motor M through a non-illustrated power transmission mechanism. That is, both power of the engine E and power of the electric motor M are transmitted to the input shaft 11a. The motorcycle 1 is not limited to a parallel hybrid motorcycle but may be a series hybrid motorcycle. A swing arm 13 supporting the rear wheel 3 and extending in the front-rear direction is supported by the vehicle body frame 4 so as to be angularly movable. The rotational power of the output shaft 11b of the transmission 11 is transmitted to the rear wheel 3 through an output transmission member 14 (e.g., a chain or belt).

A battery pack 15 supported by the seat support frame 4c is disposed rearward of the electric motor M. In particular, the battery pack 15 is disposed under the seat 9. The fact that the battery pack 15 provided for the drive system and storing electric power to be supplied to the electric motor M is disposed under the seat 9 means that the battery pack 15 which is a heavy component is located in the vicinity of the center of gravity of the motorcycle 1. A DC-DC converter 16 supported by the seat support frame 4c is disposed rearward of the battery pack 15. The DC-DC converter 16 reduces the voltage of the electric power output from the battery pack 15.

An auxiliary battery 17 supported by the seat support frame 4c is disposed rearward of the DC-DC converter 16. The auxiliary battery 17 receives a supply of the electric power output from the battery pack 15 and subjected to voltage drop across the DC-DC converter 16. Thus, the battery pack 15 outputs high-voltage electric power for activation of the electric motor M serving as a power source for travel, while the auxiliary battery 17 outputs low-voltage electric power to be supplied to electronic components (such as an ECU).

The lower end of the battery pack 15 is located below and forward of the upper end of the rear wheel 3. A part of the battery pack 15 is located below the seat support frame 4c. The battery pack 15, DC-DC converter 16, and auxiliary battery 17 are covered from below by a rear fender 18 facing the rear wheel 3. The rear fender 18 is supported by the seat support frame 4c. A front portion of the rear fender 18 covers the rear and bottom surfaces of the battery pack 15. The battery pack 15 is disposed inward of the seat support frame 4c and the auxiliary frame 4d in the vehicle width direction. The two side surfaces (left and right surfaces) of the battery pack 15 which are opposed to each other in the vehicle width direction are exposed to an environment outside the motorcycle 1. That is, the two side surfaces of the battery pack 15 in the vehicle width direction are exposed to the outside environment in a side view of the motorcycle 1, and are subjected directly to air stream during travel.

Figure 2:
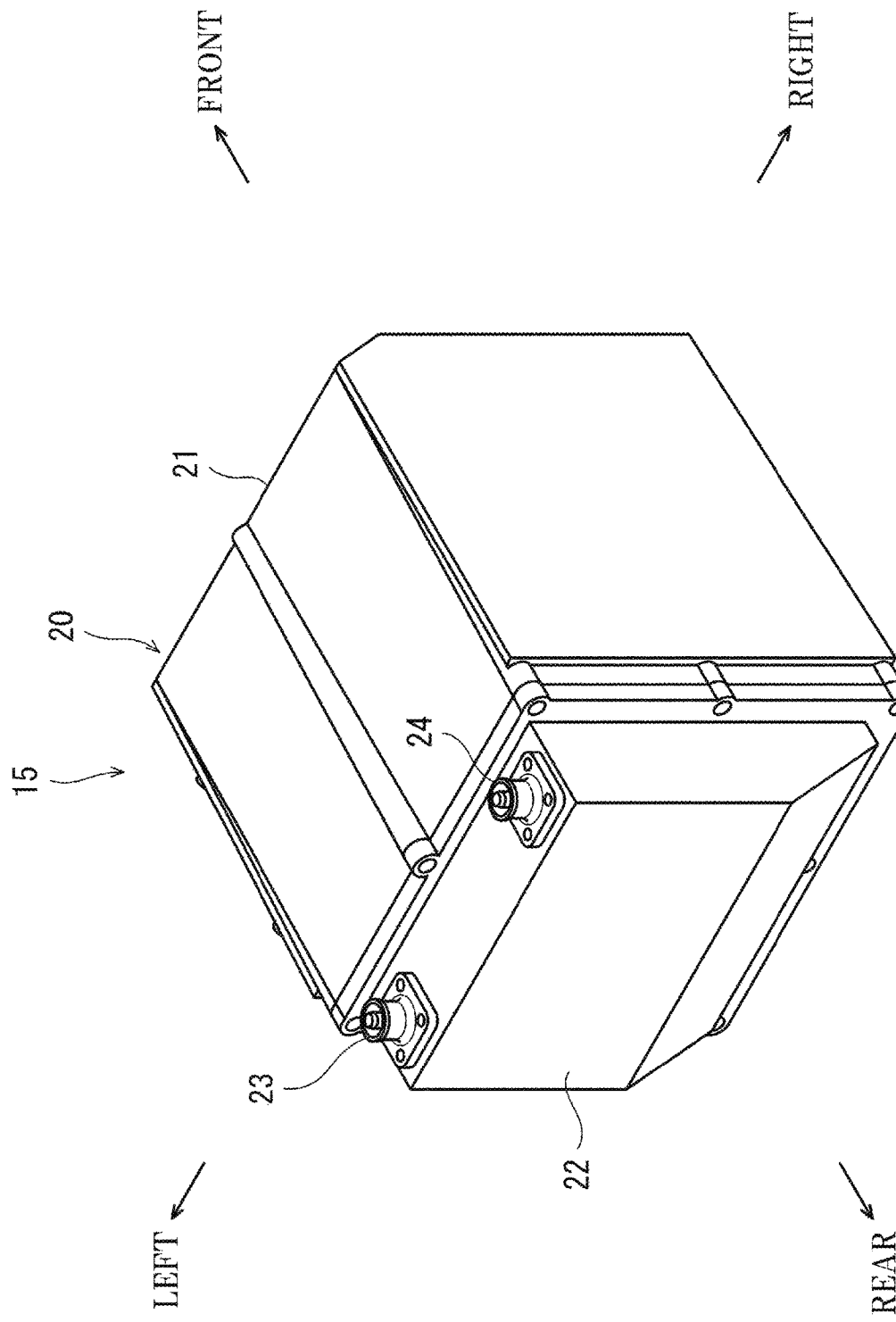
FIG. 2 is a top rear perspective view of the battery pack mounted on the motorcycle of FIG. 1.

FIG. 2 is a top rear perspective view of the battery pack 15 mounted on the motorcycle 1 of FIG. 1. The directions mentioned hereinafter are those defined based on the orientation (position) of the battery pack 15 mounted on the motorcycle 1, although the orientation of the battery pack 15 is not limited to that described below. As shown in FIG. 2, the battery pack 15 includes a casing 20 which is generally in the shape of a rectangular parallelepiped. The casing 20 includes a casing body 21 and a cover 22.

The casing body 21 is in the shape of a hexahedron with the rear surface open. The cover 22 closes the rear opening of the casing body 21 from the rear and forms a rear wall of the casing 20. The cover 22 has a recess. An internal unit 30 described later (see FIG. 3) is removably placed within the casing 20. The cover 22 is provided with a positive electrode-side connector 23 and a negative electrode-side connector 24 which are electrically connected to the internal unit 30. It is advantageous that radiating fins be provided on the left and right walls of the casing body 21.

Figure 3:
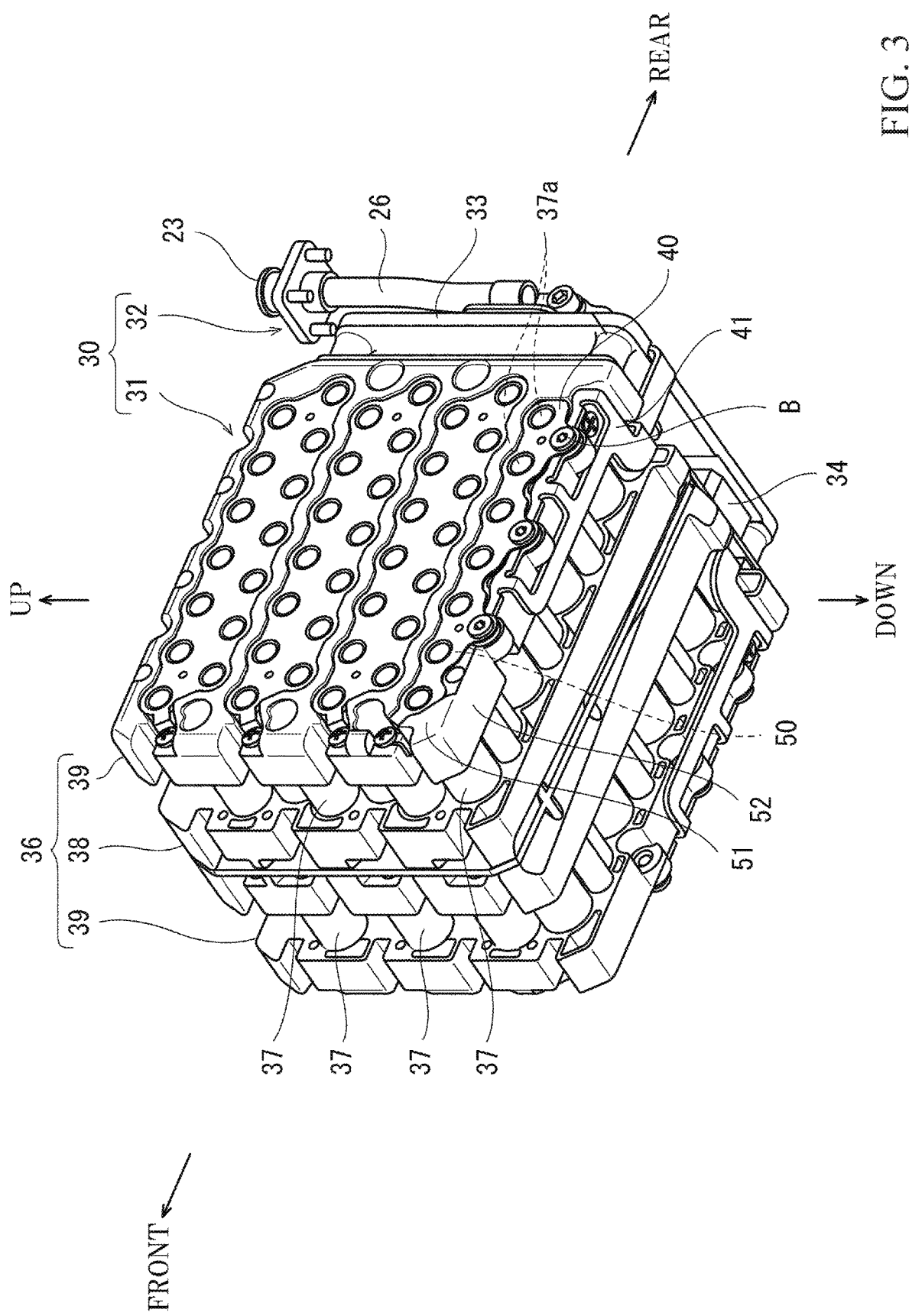
FIG. 3 is a bottom front perspective view of an internal unit of the battery pack of FIG. 2.
Figure 4:
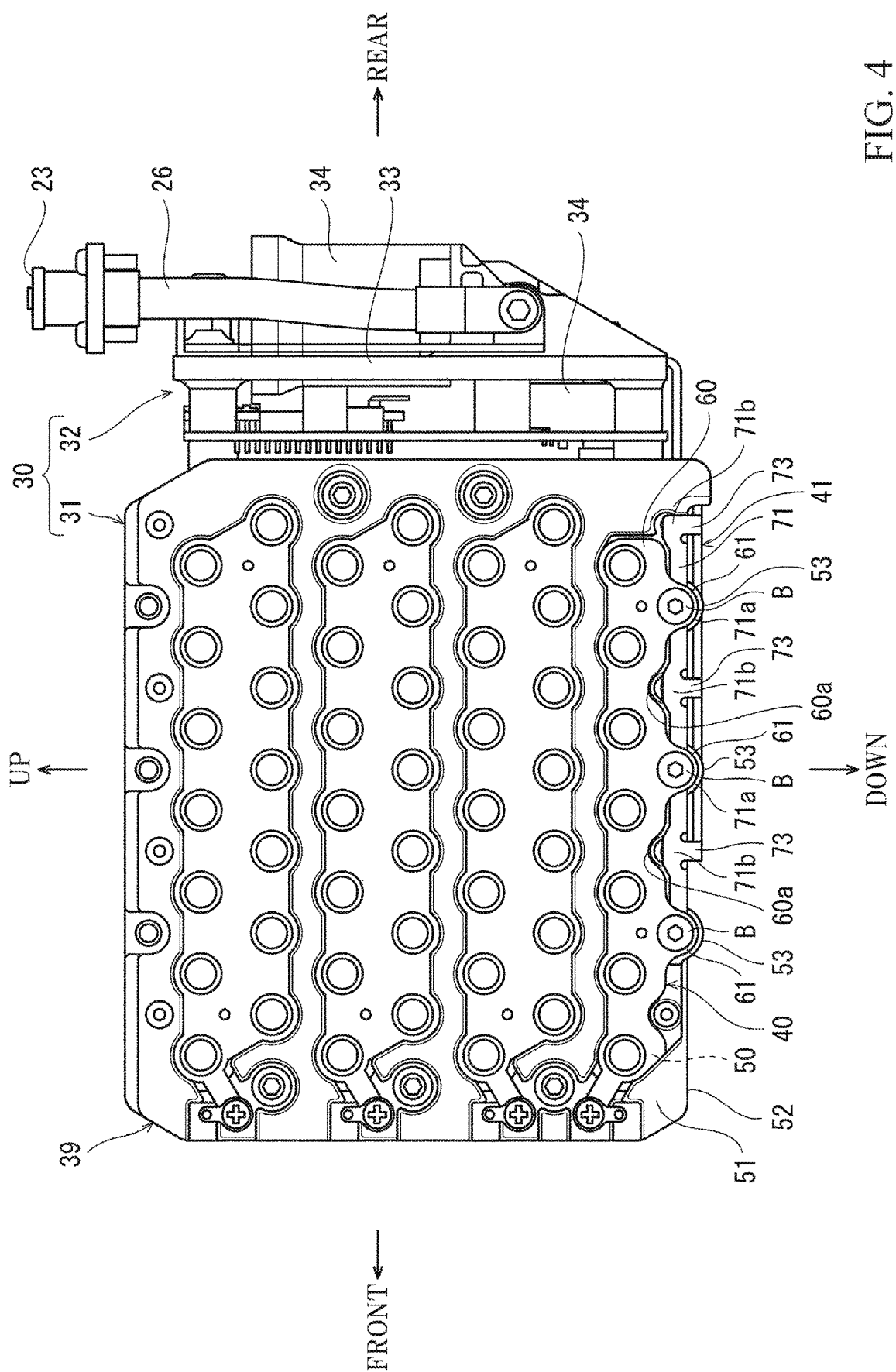
FIG. 4 is a side view of the internal unit of FIG. 3.
Figure 5:
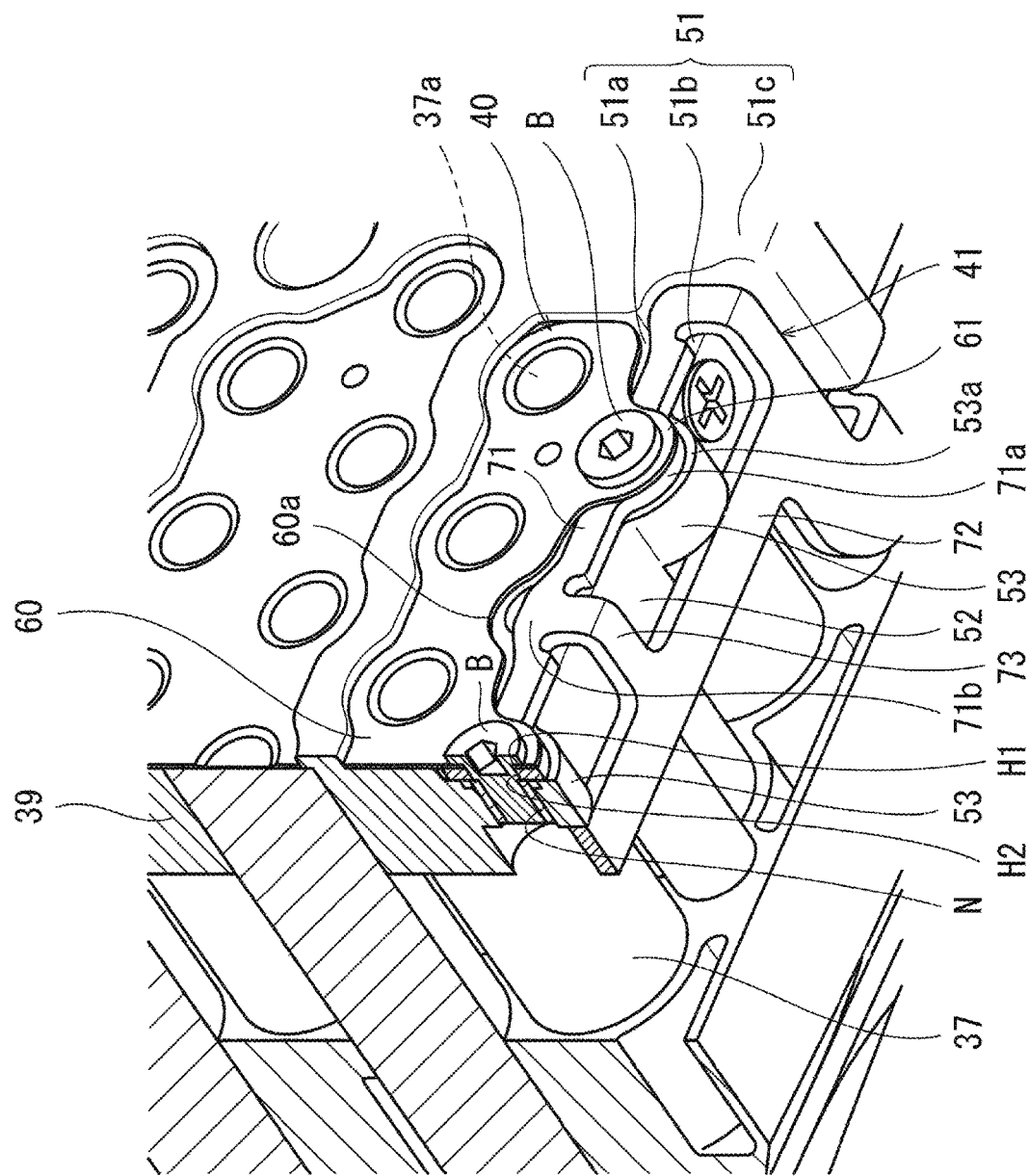
FIG. 5 is a partially enlarged view of the internal unit of FIG. 3.

FIG. 3 is a bottom front perspective view of the internal unit 30 of the battery pack 15 of FIG. 2. FIG. 4 is a side view of the internal unit 30 of FIG. 3. FIG. 5 is a partially enlarged view of the internal unit of FIG. 3. As shown in FIGS. 3 to 5, the battery pack 15 (see FIG. 2) includes the internal unit 30 accommodated in the casing 20. The internal unit 30 includes a battery assembly 31 and an electronic component assembly 32. The electronic component assembly 32 is disposed lateral to (e.g., rearward of) the battery assembly 31. Thus, an increase in the height of the internal unit 30 is prevented. The battery assembly 31 is disposed in the internal space of the casing body 21 (see FIG. 2), and the battery assembly 31 is disposed in the internal space of the cover 22.

The electronic component assembly 32 includes a platform 33 and a plurality of electronic components 34. The platform 33 is a base on which the electronic components 34 are mounted. The electronic components 34 include, for example, a BMS, a relay device, a fuse device, and a current sensor. The platform 33 is connected to a holder 36 described later.

The battery assembly 31 includes a battery cell group 35 and the holder 36. The battery assembly 31 is generally in the shape of a rectangular parallelepiped. The battery cell group 35 includes a plurality of battery cells 37. Each battery cell 37 is generally in the shape of a circular cylinder, and the battery cells 37 are arranged to form a group which is generally in the shape of a rectangular parallelepiped. The battery cells 37 are in electrical communication with one another. The battery cells 37 are disposed parallel to one another, and the terminals 37a of the battery cells 37 face outward in the left-right direction. Specifically, the battery cells 37 are arranged in two arrays opposed in the left-right direction.

The holder 36 holds the battery cells 37. The holder 36 includes a central holder 38 and a pair of end holders 39. The two arrays of the battery cells 37 are separated from each other by the central holder 38, and part of the battery cells 37 in one array and part of the battery cells in the other array are in electrical communication via a line bypassing the central holder 38. In each of the two arrays, the central holder 38-side ends of the battery cells 37 are held by the central holder 38, and the end holder 39-side ends of the battery cells 37 are held by the end holder 39. Each end holder 39 has insertion holes 50 through which the terminals 37a of the battery cells 37 are exposed to the outside in the left-right direction. The positive electrode-side terminals of the battery cell group 35 are disposed in one of the end holders 39, and the negative electrode-side terminals of the battery cell group 35 are disposed in the other of the end holders 39. The structure described hereinafter is common to both the positive electrode side and the negative electrode side. Thus, the following description is made with focus on either the positive electrode side or the negative electrode side.

The end holder 39 includes: a side surface 51 (first surface) facing outward in the left-right direction and provided with insertion holes 50 in which the battery cells 37 are inserted; and a bottom surface 52 perpendicular to the side surface 51 and facing downward. The end holder 39 includes a plurality of fastener-receiving portions 53 provided at the bottom surface 52 and arranged at intervals in the front-rear direction. Each fastener-receiving portion 53 has a flat fastener-receiving surface 53a formed at the side surface 51. The fastener-receiving portion 53 is provided with a nut N formed by insert molding. The nut N faces outward in the left-right direction and is exposed at the fastener-receiving surface 53a. Each fastener-receiving portion 53 is shaped to bulge on the bottom surface 52.

The terminals 37a of the battery cells 37 arranged parallel to one another are in electrical communication with one another via a terminal board 40 extending in the front-rear direction. A bus bar 41 is laid on the side surface 51 and bottom surface 52 of the end holder 39. The terminal board 40 and the bus bar 41 are fastened together to the fastener-receiving surfaces 53a of the end holder 39 by a plurality of bolts B (fasteners). Thus, the terminal board 40 is in contact with, and electrically connected to, the bus bar 41. The bus bar 41 is electrically connected also to an electric circuit of the electronic component assembly 32. That is, the electric circuit of the electronic component assembly 32 is in electrical communication with the terminal board 40 via the bus bar 41.

The terminal board 40 is disposed facing the side surface 51 of the end holder 39. The normal to the terminal board 40 extends outward in the left-right direction. The terminal board 40 establishes electrical connection between the terminals 37a of the battery cells 37 arranged in one direction (front-rear direction). The terminal board 40 is a metal plate thinner than the bus bar 41. The thickness of the terminal board 40 is, for example, in the range of 0.05 to 0.25 mm. The terminal board 40 includes an elongated portion 60 and a plurality of fixation portions 61.

The elongated portion 60 extends in the one direction in which the battery cells 37 are arranged. The elongated portion 60 covers the terminals 37a of the battery cells 37 arranged in the one direction. The fixation portions 61 project downward (in the width direction of the elongated portion 60) from the elongated portion 60. Each fixation portion 61 is provided with a bolt insertion hole H1. The fixation portions 61 are arranged at intervals on a long side of the elongated portion 60. The elongated portion 60 of the terminal board 40 is welded to the terminals 37a of the battery cells 37.

The bus bar 41 is a metal plate which is generally in the shape of a strip. The bus bar 41 includes a first bar portion 71, a second bar portion 72, and a plurality of coupling bar portions 73. The first bar portion 71 is disposed facing the side surface 51 of the end holder 39. The first bar portion 71 is located below the elongated portion 60 of the terminal board 40 and extends along the long side of the elongated portion 60. The first bar portion 71 covers the fastener-receiving surfaces 53a. The first bar portion 71 includes fixation portions 71a respectively facing the fastener-receiving surfaces 53a.

The fixation portion 71a of the bus bar 41 and the fixation portion 61 of the terminal board 40 are placed in face-to-face contact with each another on the fastener-receiving surface 53a of the end holder 39. The fixation portion 71a is provided with a bolt insertion hole H2. The bolt insertion holes H1 and H2 are coaxial with the nut N. The bolt B is inserted through the bolt insertion holes H1 and H2 and threaded into the nut N of the fastener-receiving portion 53. Thus, the bolt B fastens the fixation portion 61 of the terminal board 40 and the fixation portion 71a of the bus bar 41 to the fastener-receiving portion 53.

The second bar portion 72 is disposed facing the bottom surface 52. The second bar portion 72 extends generally parallel to the first bar portion 71. The second bar portion 72 is situated at a different location than the fastener-receiving portions 53 bulging from the bottom surface 52 of the end holder 39. Each of the coupling bar portions 73 is bent in an L-shape. The coupling bar portions 73 connect the first bar portion 71 to the second bar portion 72. The coupling bar portions 73 are arranged at intervals in the length direction of the first bar portion 71. In the length direction of the first bar portion 71, the coupling bar portions 73 are situated at different locations than the fastener-receiving portions 53 of the end holder 39.

The second bar portion 72 and the coupling bar portions 73 are shaped to bypass the fastener-receiving portions 53. The second bar portion 72 is parallel to the bottom surface 52 of the end holder 39. The coupling bar portions 73 are not located in the downward direction (namely, the direction of bulging of the fastener-receiving portions 53) with respect to the second bar portion 72. The second bar portion 72 and the coupling bar portions 73 are located at the same level as at least a part of each fastener-receiving portion 53 in the direction of the normal to the bottom surface 52. The lower surface of the bus bar 41 is located at the same level as the lowermost points of the fastener-receiving portions 53 or located above (closer to the bottom surface 52 than) the lowermost points of the fastener-receiving portions 53.

The side surface 51 of the end holder 39 includes a terminal board mounting surface 51a, a bar mounting surface 51b, and a major surface 51c. The terminal board 40 is mounted on the terminal board mounting surface 51a. The first bar portion 71 of the bus bar 41 is mounted on the bar mounting surface 51b. The major surface 51c is a region extending over the entire side surface 51, except for the terminal board mounting surface 51a and the bar mounting surface 51b. The terminal board mounting surface 51a is recessed relative to the major surface 51c. The bar mounting surface 51b is recessed relative to the terminal board mounting surface 51a.

The lower edge of the elongated portion 60 of the terminal board 40 (the edge located in proximity to the first bar portion 71) includes concave portions 60a recessed in a direction away from the first bar portion 71 of the bus bar 41 (namely, in the upward direction). The first bar portion 71 of the bus bar 41 includes offset portions 71b projecting toward the concave portions 60a. The lower ends of the offset portions 71b are located above the lower ends of any parts of the first bar portion 71 other than the offset portions 71b. The coupling bar portions 73 are connected to the lower ends of the offset portions 71b of the first bar portion 71. Each of the fastener-receiving portions 53 of the end holder 39 and the concave portions 60a of the terminal board 40 is disposed between two adjacent battery cells of the plurality of battery cells 37 in the direction in which the battery cells 37 are arranged (front-rear direction). The fastener-receiving portions 53 of the end holder 39 and the concave portions 60a of the terminal board 40 alternate with one another.

In the above-described configuration, where the thin, elongated terminal board 40 is welded to the terminals 37a of the battery cells 37, the elongated terminal board 40 is provided with the plurality of fixation portions 61 on its long side and connected to the bus bar 41 at the plurality of fixation portions 61. Thus, unlike the case where the terminal board 40 is connected at its short side to the bus bar 41, local narrowing of the current-carrying cross-section can be prevented, and local heat generation in the terminal board 40 can be reduced.

Additionally, since the bus bar 41 includes the second bar portion 72 and coupling bar portions 73 which are shaped to bypass the fastener-receiving portions 53 of the holder 36 and which are located at the same level as at least a part of each fastener-receiving portion 53 in the up-down direction, the bus bar 41 is prevented from projecting beyond the fastener-receiving portions 53. This can contribute to size reduction of the battery pack 15.

Additionally, since in the bus bar 41 the coupling bar portions 73 are connected to the offset portions 71b of the first bar portion 71, the length of the coupling bar portions 73 can be increased while preventing size increase of the battery pack 15. Thus, the coupling bar portions 73 can easily be formed in a bent shape.

Additionally, since each of the fastener-receiving portions 53 and concave portions 60a is disposed between two adjacent battery cells of the plurality of battery cells 37 in the direction in which the battery cells 37 are arranged and since the fastener-receiving portions 53 and concave portions 60a alternate with one another in the direction in which the battery cells 37 are arranged, a plurality of current-carrying passages between the terminal board 40 and the bus bar 41 are distributed in the length direction of the elongated portion 60 of the terminal board 40. Thus, local heat generation can be effectively reduced.

Additionally, since in the side surface 51 of the end holder 39 the bar mounting surface 51b is recessed relative to the terminal board mounting surface 51a, the bus bar 41 can be prevented from projecting on the side surface 51 of the end holder 39. This can contribute to size reduction of the battery pack 15. Additionally, since in the side surface 51 of the end holder 39 the terminal board mounting surface 51a is recessed relative to the major surface 51c, contact of an object with the terminal board 40 or the bus bar 41 can be prevented in the event that the object accidentally contacts the major surface 51c of the end holder 39.

The present invention is not limited to the embodiment described above, and various changes, additions, or deletions can be made to the configuration of the above embodiment. For example, the vehicle is not limited to a motorcycle and may be another type of vehicle (e.g., another type of straddle vehicle on which the rider rides in a straddling position, such as a motor tricycle). The vehicle need not be a hybrid vehicle, and may be an electric vehicle equipped with no internal combustion engine and running on drive power of an electric motor. The position (orientation) of the battery pack may be different from that in the above embodiment. The battery pack can be used not only as a power supply for an electric motor of a vehicle but also as a power supply for another device (such as a stationary device).

What is claimed is:

1. A battery pack comprising:
a battery cell group comprising a plurality of battery cells disposed parallel to each other;
a holder holding the battery cell group, the holder comprising a first surface provided with insertion holes in which the battery cells are inserted, a second surface perpendicular to the first surface, and a plurality of fastener-receiving portions each having a fastener-receiving surface formed at the first surface;
a terminal board disposed facing the first surface of the holder and electrically connecting terminals of the battery cells to each other;
a bus bar electrically connected to the terminal board; and
a plurality of fasteners fastening both the terminal board and the bus bar to the holder and electrically connecting the terminal board to the bus bar, wherein
the terminal board is thinner than the bus bar and welded to the terminals of the battery cells,
the terminal board comprises an elongated portion extending in a direction in which the battery cells are arranged and a plurality of fixation portions arranged at intervals on a long side of the elongated portion,
the bus bar comprises a plurality of fixation portions respectively placed in face-to-face contact with the fixation portions of the terminal board, and
the fasteners fasten the fixation portions of the terminal board and the fixation portions of the bus bar to the fastener-receiving portions.

2. The battery pack according to claim 1, wherein
each fastener-receiving portion is shaped to bulge on the second surface,
the bus bar comprises: a first bar portion disposed facing the first surface, extending along the long side of the elongated portion, and comprising the fixation portions of the bas bar; a second bar portion disposed facing the second surface; and a plurality of coupling bar portions connecting the first bar portion to the second bar portion, each coupling bar portion being formed in a bent shape,
the fixation portions of the terminal board project from the elongated portion in a width direction of the elongated portion,
the coupling bar portions are arranged at intervals in a length direction of the first bar portion and situated at different locations than the fastener-receiving portions in the length direction of the first bar portion,
the second bar portion and the coupling bar portions are shaped to bypass the fastener-receiving portions, and
the second bar portion and the coupling bar portions are located at the same level as at least a part of each fastener-receiving portion in a direction of a normal to the second surface.

3. The battery pack according to claim 2, wherein
the terminal board has an edge located in proximity to the first bar portion, the edge comprising concave portions recessed in a direction away from the first bar portion,
the first bar portion comprises offset portions projecting toward the concave portions, and
the coupling bar portions are connected to the offset portions.

4. The battery pack according to claim 3, wherein
each of the fastener-receiving portions and the concave portions is disposed between two adjacent battery cells of the plurality of battery cells in the direction in which the battery cells are arranged, and
the fastener-receiving portions and the concave portions alternate with one another in the direction in which the battery cells are arranged.

5. The battery pack according to claim 1, wherein
the first surface comprises a terminal board mounting surface on which the terminal board is mounted and a bus bar mounting surface on which the bus bar is mounted, and
the bus bar mounting surface is recessed relative to the terminal board mounting surface.

6. The battery pack according to claim 5, wherein
the first surface comprises a major surface other than the terminal board mounting surface and the bus bar mounting surface, and
the terminal board mounting surface is recessed relative to the major surface.

7. The battery pack according to claim 1, wherein the terminal board has a thickness of 0.05 to 0.25 mm.

* * * * *